United States Patent
Gieshoff et al.

(10) Patent No.: US 8,678,813 B2
(45) Date of Patent: Mar. 25, 2014

(54) METHOD FOR PRODUCING A STREAM OF HOT COMBUSTION EXHAUST GASES AT A SETTABLE TEMPERATURE, APPARATUS FOR CARRYING OUT THE METHOD AND USE OF THE COMBUSTION EXHAUST GASES FOR THE TARGETED AGEING OF CATALYSTS

(75) Inventors: Juergen Gieshoff, Gelnhausen (DE); Hartmut Finkbeiner, Baiersbronn (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1009 days.

(21) Appl. No.: 11/722,123

(22) PCT Filed: Dec. 17, 2005

(86) PCT No.: PCT/EP2005/013618
§ 371 (c)(1),
(2), (4) Date: Jan. 15, 2009

(87) PCT Pub. No.: WO2006/066836
PCT Pub. Date: Jun. 29, 2006

(65) Prior Publication Data
US 2009/0126354 A1    May 21, 2009

(30) Foreign Application Priority Data
Dec. 21, 2004 (DE) .......................... 10 2004 061 400

(51) Int. Cl.
*F01N 3/00* (2006.01)

(52) U.S. Cl.
USPC ................. 431/3; 431/116; 431/202; 60/288; 60/274; 73/118.1; 73/23.31

(58) Field of Classification Search
USPC ............. 431/3, 4, 5, 7, 12, 116, 202; 60/288, 60/274; 73/118.1, 23.32
See application file for complete search history.

(56) References Cited

U.S. PATENT DOCUMENTS 3,604,824 A * 9/1971 Hardison ................. 431/116
4,315,559 A * 2/1982 Casey .................... 181/265
(Continued)

FOREIGN PATENT DOCUMENTS

DE    296 11 034 U1    11/1997
DE    100 43 621 A1    3/2002
(Continued)

OTHER PUBLICATIONS

Machine Translation of EP1186757 (DE10043621) is attached.*
(Continued)

*Primary Examiner* — Steven B McAllister
*Assistant Examiner* — Nikhil Mashruwala
(74) *Attorney, Agent, or Firm* — Smith, Gambrell and Russell, LLP

(57) ABSTRACT

A stream of exhaust gases from the combustion of hydrocarbon-containing fuels with a variable temperature can be produced by dividing the exhaust gases into two separate part-streams, cooling one part-stream and then combining the two part-streams again. The temperature of the exhaust-gas stream which has been combined again can be set to between the temperature of the combustion of the hydrocarbon-containing fuels and the temperature of the cooled exhaust-gas part-stream by corresponding throttling of the two part-streams before they are brought together again. The exhaust-gas stream produced in this way is preferably used for the defined ageing of automotive exhaust catalysts. In this context, it is particularly advantageous that the change in the temperature of the exhaust-gas stream has no influence on its air/fuel ratio.

27 Claims, 3 Drawing Sheets

(56) References Cited

U.S. PATENT DOCUMENTS

| | | | |
|---|---|---|---|
| 4,793,974 A * | 12/1988 | Hebrank | 422/175 |
| 5,044,935 A * | 9/1991 | Peter | 431/182 |
| 5,229,079 A | 7/1993 | Harada et al. | |
| 5,264,186 A | 11/1993 | Harada et al. | |
| 5,768,888 A * | 6/1998 | Matros et al. | 60/274 |
| 5,855,113 A * | 1/1999 | Cullen et al. | 60/274 |
| 6,009,703 A * | 1/2000 | Bouchez et al. | 60/274 |
| 6,141,961 A * | 11/2000 | Rinckel | 60/288 |
| 6,173,568 B1 * | 1/2001 | Zurbig et al. | 60/274 |
| 6,383,463 B1 * | 5/2002 | Mochida et al. | 423/239.1 |
| 7,131,320 B2 * | 11/2006 | Weinowski et al. | 73/114.75 |
| 2002/0112468 A1 * | 8/2002 | Barrett et al. | 60/280 |
| 2003/0079520 A1 * | 5/2003 | Ingalls et al. | 73/23.31 |
| 2004/0251012 A1 | 12/2004 | Bush et al. | |
| 2009/0031933 A1 * | 2/2009 | Ookawa et al. | 110/345 |
| 2012/0167553 A1 * | 7/2012 | Qi et al. | 60/274 |

FOREIGN PATENT DOCUMENTS

| | | | |
|---|---|---|---|
| DE | 102 32 120 A1 | 2/2004 | |
| DE | 103 52 265 A1 | 6/2005 | |
| EP | 1 013 997 A2 | 6/2000 | |
| EP | 1 111 212 A2 | 6/2001 | |
| EP | 1186757 * | 3/2002 | F01N 3/04 |
| JP | 2000-213338 | 8/2000 | |
| WO | 99/60255 A1 | 11/1999 | |

OTHER PUBLICATIONS

Webb, Cynthia C., "Development of a Methodology to Separate Thermal From Oil Aging of a Catalyst Using a Gasoline-Fueled Burner System" 08-9217, by the Southwest Research Institute, San Antonio, TX—2004.

Calsim, Caps Hessgaserzeuger.

* cited by examiner

METHOD FOR PRODUCING A STREAM OF HOT COMBUSTION EXHAUST GASES AT A SETTABLE TEMPERATURE, APPARATUS FOR CARRYING OUT THE METHOD AND USE OF THE COMBUSTION EXHAUST GASES FOR THE TARGETED AGEING OF CATALYSTS

CROSS-REFERENCE TO RELATED APPLICATIONS

This application claims the benefit of priority of German Patent Application No. 10 2004 061 400.8 filed Dec. 21, 2004, and International Application No. PCT/EP2005/013618 filed Dec. 17, 2005, both of which are relied on and incorporated herein by reference.

INTRODUCTION AND BACKGROUND

The invention relates to a method for producing a stream of hot combustion exhaust gases at a settable temperature, to an apparatus for carrying out the method and to the use of the combustion exhaust gases for the ageing of automotive exhaust catalysts.

Modern catalysts used to purify the exhaust gases from motor vehicles have to ensure a lifespan of at least 100,000 km driving distance in the vehicles. Therefore, development of the catalysts requires ageing methods which simulate the loads which occur over the lifespan of the catalyst at low cost and within the shortest possible time. In this context, it is necessary to simulate, inter alia, the air/fuel ratio lambda ($\lambda$) of the engine exhaust gas to which the catalyst will be exposed in operation. The air/fuel ratio is the ratio of air to fuel with which the engine is operated, standardized to stoichiometric conditions. The air/fuel ratio is 1 when the intake air supplied is just sufficient for complete combustion of the fuel. The air/fuel ratio of the exhaust gas emitted by the engine is equal to the air/fuel ratio of the air/fuel mix fed to the engine.

In operation, the catalysts are exposed to significant thermal loads. Moreover, the catalyst activity is gradually poisoned in operation by poisoning constituents in the exhaust gas. Both ageing phenomena can be simulated at low cost by a burner for generating a hot exhaust gas.

By way of example, manufacturers of exhaust systems use burners to test the ability of the systems to withstand thermal loads. For example, the company Caloric supplies corresponding burner systems.

Research report 08-9217 by the Southwest Research Institute, San Antonio, Tex. describes a burner apparatus for determining the influence of the engine oil on the ageing of a catalyst. This burner apparatus also forms the subject matter of US Publication US 2003/0079520 A1. The exhaust-gas temperature before entry to the catalyst is set with the aid of a heat exchanger.

The company CalSim describes an alternative method. In this company's CAPS hot-gas generator, the hot gas is generated by the combustion of natural gas or diesel fuel/fuel oil EL and admixing cooling air. The burner power is 42 to 90 kW. The temperature can be set to between 300 and 950° C. by admixing cooling air. The air/fuel ratio $\lambda$ of the exhaust gas produced is between 2.75 and 10 and is therefore always well into the lean range. Consequently, the exhaust gas produced in this way is of only limited use for tests on the ageing of catalysts, and in particular three-way catalysts, which are operated under stoichiometric conditions, cannot be tested in this way.

A further arrangement for testing the thermal ageing of catalysts having a burner is described in US Patent Application US 2002/0112468 A1. The power and air/fuel ratio are set by controlling the mass flows of fuel and combustion air. There is no heat exchanger for variably setting the exhaust-gas temperature.

Not all parameters which are of relevance to the exhaust gas can be set both by engines and by burners. For example, in the case of the engine, the exhaust-gas temperature, the untreated emissions, the engine power and the air/fuel ratio lambda ($\lambda$) are linked to one another via the torque demanded by the driver. Therefore, to replace engine ageing by burner ageing, it is necessary for it to be possible for as many parameters as possible to be set independently of one another. This applies in particular to the temperature, the air/fuel ratio and the exhaust-gas mass flow (=power).

SUMMARY OF THE INVENTION

It is an object of the present invention to provide a method by which a stream of hot combustion exhaust gases at a settable temperature can be produced easily and at low cost for the ageing of automotive exhaust catalysts, as well as an apparatus for carrying out the method. Moreover, it should be possible for the air/fuel ratio and exhaust-gas mass flow of the combustion exhaust gases to be set independently of the temperature.

This object is achieved by the exhaust gases originating from a combustion process being divided into a first part-stream and a second part-stream, with different mass flows. The second part-stream is cooled and then combined with the first part-stream again. The stream of hot combustion exhaust gases formed in this way is at a temperature between the temperature of the combustion process and the temperature of the cooled part-stream.

Liquid or gaseous, hydrocarbon-containing fuels can be burnt with air to produce the hot combustion exhaust gases.

When carrying out the method, the mass flows of the two part-streams are maintained, i.e. no cooling gas is admixed to the second part-stream for cooling purposes. Therefore, the cooling does not change the air/fuel ratio of the second part-stream, and consequently even after it has been combined again with the first part-stream, the air/fuel ratio corresponds to the air/fuel ratio of the combustion process set at the burner.

The temperature of the combustion exhaust gases produced depends on the ratio of the mass flows of the two part-streams and their temperature before they are combined again, and can be set in a simple way by suitable throttling of the two part-streams. The maximum temperature is set by throttling the second part-stream down to zero, and the minimum temperature of the combustion gas stream is set by throttling the first part-stream down to zero.

To produce the two part-streams, the exhaust gas generated by the combustion process is preferably divided into a direct stream and a reversed stream, with the direct stream forming the first part-stream and the reversed stream forming the second part-stream.

Power and air/fuel ratio lambda ($\lambda$) of the combustion process can be set substantially independently of one another by controlling the mass flow $m_F$ of the fuel and by controlling the mass flow $m_A$ of the combustion air, respectively. The power of the combustion process is directly linked to the magnitude of the exhaust-gas mass flow. The higher the power, the greater the exhaust-gas mass flow.

The combustion exhaust gases produced by the method with power, air/fuel ratio and temperature which can be set independently of one another can be used for various test purposes. The exhaust gases are preferably used for the defined thermal ageing of automotive exhaust catalysts. In this case, the settable power is used to define the space velocity to which the catalysts are subjected during the ageing tests. The loads which occur when the catalysts are operating can be simulated by controlling the power, air/fuel ratio and temperature.

Furthermore, poisoning tests can also be carried out using the proposed method. For this purpose, oil additives, the constituents of which in some cases act as catalyst poisons, such as for example phosphorus, sulphur, zinc and calcium, can be added to the fuel. Furthermore, it is possible to add ammonia or a compound which decomposes to form ammonia to the combustion air, in order to subject the catalysts that are to be aged to an increased concentration of nitrogen oxides.

When catalysts and particulate filters are operating, an post-injection of fuels into the engine exhaust gas is often performed in order to regenerate the properties of catalysts and filters which have been impaired by operation. These loads can also be simulated using the proposed method, by petrol or diesel fuel being added to the combustion exhaust gases before they enter the catalyst that is to be aged.

In addition to these preferred uses of the combustion exhaust gases, the exhaust gases can also be used for other purposes. For example, it is also possible to use the exhaust gases to subject ceramic components to a defined, thermal load under an oxidizing or reducing atmosphere.

BRIEF DESCRIPTION OF DRAWINGS

The invention is explained in more detail below with reference to the figures and the example. In the drawings.

DETAILED DESCRIPTION OF THE INVENTION

Figure 1:
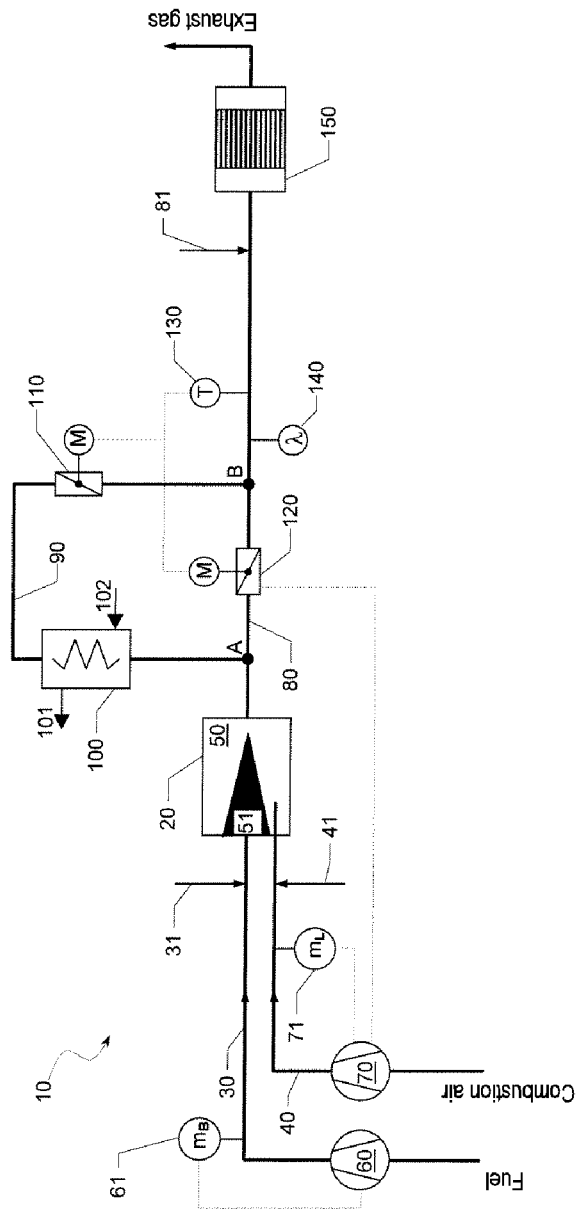
FIG. 1: diagrammatically depicts an apparatus for carrying out the method.

FIG. 1 diagrammatically depicts an apparatus (10) for producing a stream of hot combustion exhaust gases at a settable temperature, air/fuel ratio and mass flow. The apparatus shown is designed for the use of liquid fuels, such as diesel fuel, petrol or ethanol. If gaseous fuels are used, it is merely necessary for the fuel pump (60) to be replaced by a suitable compressor.

The apparatus illustrated in FIG. 1 includes a burner device (20), which is supplied with fuel and combustion air via the feeds (30) and (40), respectively. The fuel is compressed to the operating pressure required for operation of the overall system by means of a pump (60). The fuel flow $m_F$ is determined by means of a sensor (61) and set by means of the fuel pressure in accordance with the set value stipulations from a control unit (not shown). The fuel is burnt in the combustion chamber (50). The air mass flow $m_A$ is measured with the aid of the sensor (71) and set, by means of the rotational speed of the fan (70), by the control unit in accordance with the set value stipulations for the air/fuel ratio lambda (λ). The actual value of the air/fuel ratio is determined by the sensor (140) upstream of the catalyst (150) that is to be tested.

The hot exhaust gas from the combustion process is discharged via a first exhaust pipe (80). This exhaust pipe includes a throttle valve (120). A second exhaust pipe (90) forms a bypass line to the throttle valve (120) of the first exhaust pipe. This second exhaust pipe includes a heat exchanger (100) and likewise a throttle valve (110). Reference numeral (101) denotes the admission to the heat exchanger, and reference numeral (102) denotes the return from the heat exchanger. The two mass flows in the exhaust pipes can be altered relative to one another by the two throttle valves (110) and (120).

The first and second exhaust pipes are combined again at point B downstream of the throttle valves, as seen in the exhaust-gas direction, to form a common exhaust pipe. The catalyst (150) to be tested is arranged in this common pipe. The sensor (140) for determining the air/fuel ratio (lambda sensor) in the common exhaust pipe is located just upstream of the catalyst. It is used to control the air/fuel ratio to the desired level.

The signal from a temperature sensor (130), likewise arranged upstream of the catalyst, is used to control the temperature of the exhaust-gas stream before it enters the catalyst, by changing the position of the throttle flaps of the throttle valves (110) and (120). This alters the mass flow ratio of the two part-streams and thereby sets the desired temperature upstream of the catalyst.

The sensors, and in particular the sensors which are of relevance to the control, can be fitted at different positions depending on the particular application. By way of example, it may be desirable to set a constant temperature downstream of the catalyst or to measure the lambda signal upstream or downstream of the injection location (81).

With the aid of this apparatus, the temperature, air/fuel ratio and mass flow of the combustion exhaust gases can be set independently of one another in a simple way. It is therefore eminently suitable for the ageing of catalysts. It has been found that catalysts aged in this way when their catalytic activity is tested on the vehicle, have similar properties to catalysts which have been aged while connected to the engine.

An injection location (31) for the injection of gaseous or liquid additives, in particular oil additives, is provided in the fuel feed (30) in order to simulate the poisoning of automotive exhaust catalysts with poisoning elements from oil additives. The combustion-air feed (40) likewise has an injection location (41) for the injection of gaseous or liquid additives, in particular for ammonia or a compound which can decompose to form ammonia, such as for example urea. Furthermore, the exhaust pipe (80) also has an injection location (81) for the injection of gaseous or liquid additives, such as for example petrol, diesel fuel or urea solution, in order for the ageing of SCR catalysts to simulate conditions encountered in reality.

The number and position of the injection locations can be selected as desired. By way of example, it may be appropriate to provide two injection locations for the exhaust pipe, in order to inject fuel and air. Both single-substance nozzles and two-substance nozzles can be used for the injection.

Figure 2:
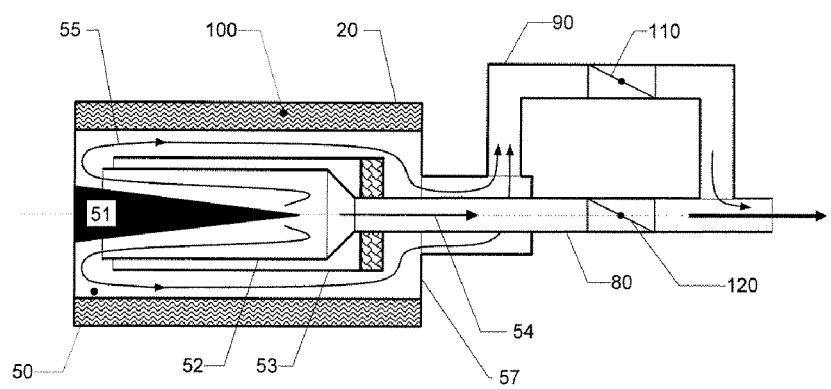
FIG. 2: shows an apparatus for carrying out the method
Figure 3:
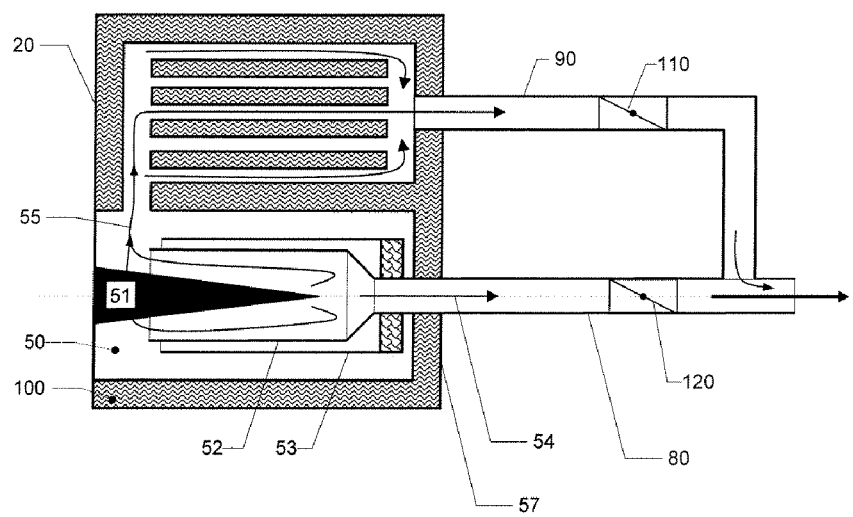
FIG. 3: shows an alternative apparatus for carrying out the method

As shown in FIG. 1, the exhaust gas produced by the burner can be divided into the two part-streams downstream of the burner device, at point A. However, it is preferable for the division to be performed directly in the burner device itself. In this case, the heat exchanger forms a first section in the second exhaust pipe. Preferred embodiments of this are shown in FIGS. 2 and 3. Both embodiments can be obtained by converting commercial heating boilers. Heating boilers of this type have a combustion chamber (50) in which the burner device is arranged. The combustion chamber is usually water-cooled and forms part of the heat exchanger of the heating boiler. It is preferable to use heating boilers with what is known as reversed firing. The exhaust gas from a boiler of this type forms a reversed stream (55) and releases its heat to the heat exchanger. This reversed stream is used as the second part-stream of the method. To produce the first part-stream of combustion exhaust gases, the rear wall (57), remote from the burner, of the heating boiler has to be drilled through. Some of the exhaust gas produced by the burner is discharged from the combustion chamber through this drilled hole, as direct stream (54).

The heat exchanger of the heating boiler forms the heat exchanger (100) required for the cooling of the second part-stream. In the case shown in FIG. 2, the heat exchanger is merely the water-cooled boiler walls surrounding the burner device. In the case shown in FIG. 3, the heat exchanger is constructed as a tubular heat exchanger operating on the countercurrent principle and is arranged directly above the combustion chamber.

In FIGS. 2 and 3, the burner flame (51) is guided by a concentrically arranged tube (52). This tube opens out into the first exhaust pipe (80) and supplies the latter with the first exhaust-gas stream. To ensure a wide control range for the temperature, this exhaust-gas stream should as far as possible leave the heating boiler in uncooled form, at the combustion temperature. It is therefore advantageous for a radiation protection shield (53) to be arranged around the tube (52), which radiation protection shield minimizes radiation losses from this tube to the water-cooled walls of the combustion chamber.

The heat exchanger required for the method may be designed as a gas/gas heat exchanger. However, it is more advantageous to use a gas/water heat exchanger, as is fitted as standard in commercial heating boilers. This results in a small heat exchanger area being required, and therefore a compact overall structure. The integration of the heat exchanger in the burner structure results in very important safety advantages. If the heat exchanger is designed in such a way that the entire combustion chamber is surrounded by water (e.g. by means of a concentric structure around the burner flame), the maximum temperature at the outer surface can easily be restricted to below 80° C., even though it is possible to set the temperature of the hot-gas stream to between 80 and 800° C. To avoid condensation problems, the heat exchanger (100) is operated at a return (102) temperature which is above the dew point of the exhaust gas. The dew point is a function of the burner air/fuel ratio, and is approximately 65° C. at an air/fuel ratio of 1.

The minimum temperature of the combustion exhaust gases is determined by the design of the heat exchanger. If very low temperatures are required, it may be expedient to divide the heat exchanger into a plurality of sections.

The apparatus according to the invention can be designed for hot-gas temperatures of between 80 and 1200° C. at heating powers of between 2 and 5000 kW. In practice, an ageing apparatus for a control range for the temperature of the combustion exhaust gases of between 80 and 900° C. and with a power of from 30 to 60 kW was realized. With a further apparatus, it was possible to realize a control range for the temperature of the combustion exhaust gases of between 200 and 1000° C. with air/fuel ratios of from 0.9 to 1.8 at burner powers of between 150 and 500 kW.

Example 1

Figure 4:
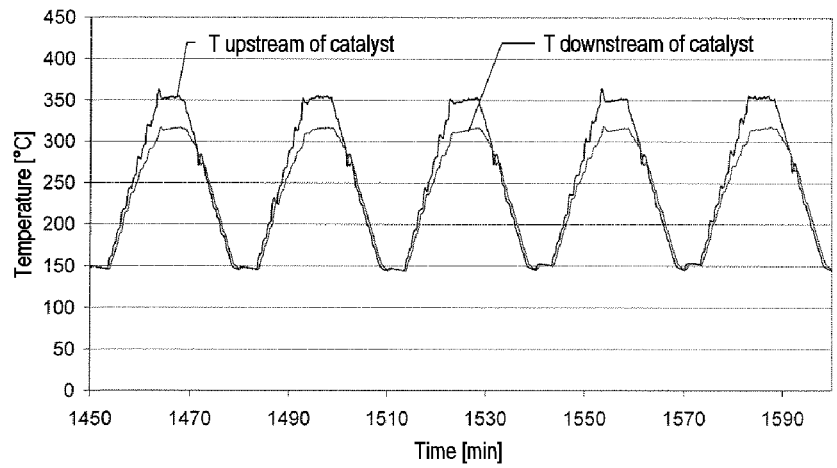
FIG. 4: shows the ageing of a catalyst caused by loading with a hot-gas stream at a temperature alternating between 150 and 350° C.

FIG. 4 shows, by way of example, the excellent control properties of the temperature of the combustion exhaust gases produced using the apparatus shown in FIG. 2. An oil burner with a nominal power of 60 kW was used to expose a diesel oxidation catalyst to hot combustion exhaust gases. The temperature of the exhaust gases was changed cyclically, in a trapezoidal form, between 150 and 350° C. FIG. 1 shows the temperature curve upstream of the catalyst and the temperature curve downstream of the catalyst.

Example 2

An apparatus as shown in FIG. 3 was equipped with an oil burner with a nominal power of 500 kW. Power, air/fuel ratio and temperature were controlled independently of one another in a test run. During the test run, the test protocol listed in Table 1 was passed through in each case five times.

TABLE 1

Set values for power, air/fuel ratio and temperature during a test run

| Duration/min | Power/kW | Air/fuel ratio/- | Temperature/° C. |
| --- | --- | --- | --- |
| 10 | 250 | 1.5 | 500 |
| 10 | 250 | 1.5 | 700 |
| 10 | 350 | 1.3 | 700 |

Figure 5:
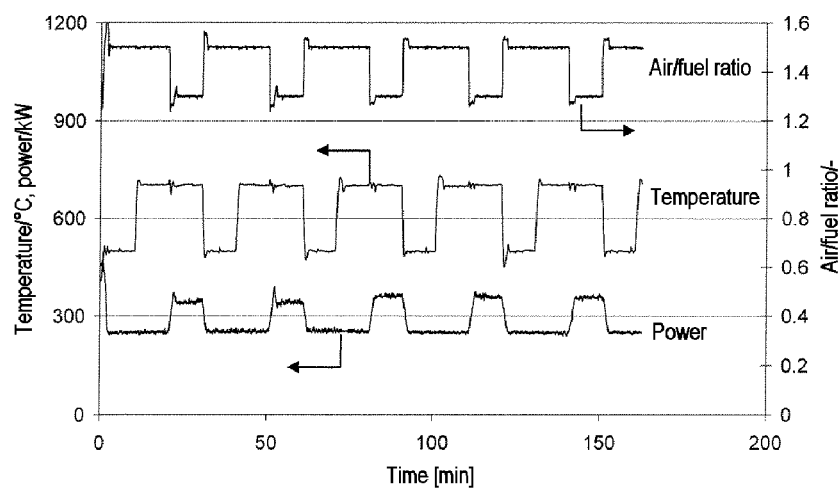
FIG. 5: shows the independent control of power, air/fuel ratio and temperature of the hot-gas stream.

The measured values for power, air/fuel ratio and temperature as a function of time are illustrated in FIG. 5. The curves presented in FIG. 5 demonstrate the good control properties of the above-mentioned method parameters using the method according to the invention.

The invention claimed is:

1. A method for producing a stream of hot combustion exhaust gases with a settable temperature for use in the defined ageing of an exhaust catalyst, the method comprising:
    producing exhaust gases from a burner apparatus combustion process involving a burner apparatus operating within a combustion chamber;
    dividing the exhaust gases originating from the burner apparatus combustion process into a first part-stream and a second part-stream, with different mass flows;
    combining again the first part-stream and the second part-stream after cooling of the second part-stream, in order to produce the stream of hot combustion exhaust gases at a desired temperature between the temperature of the combustion process and the temperature of the cooled, second part-stream; and
    defined ageing of an exhaust catalyst involving subjecting the exhaust catalyst to the stream of hot combustion exhaust gases produced at the desired temperature, and
    wherein the production of a stream of hot combustion gases derived from the burner apparatus combustion process comprises operating the burner apparatus according to the principle of reverse firing, wherein a flow direction of the second part-stream is reversed relative to a flow direction of the first part-stream.

2. Method according to claim 1, wherein the ratio of the mass flows of the first and second part-streams to one another, and therefore the resulting temperature of the exhaust-gas streams combined again is set by corresponding throttling of the two part-streams through use of first and second throttle valves respectively positioned within the first and second part-streams.

3. Method according to claim 2, wherein the maximum temperature of the stream of hot combustion exhaust gases is set by throttling the second part-stream down to zero by way of an adjustment of said second throttle valve, and the minimum temperature of the combustion gas stream is set by throttling the first part-stream down to zero by way of an adjustment of said first throttle valve.

4. Method according to claim 1, wherein the combustion process involves the combustion of liquid or gaseous, hydrocarbon-containing fuels with air.

5. Method according to claim 4, wherein the power of the combustion process is set by controlling the mass flow of the fuel and the air/fuel ratio lambda ($\lambda$) of the hot exhaust gases generated is set by controlling the mass flow of the combustion air $m_A$.

6. Method according to claim 4, wherein oil additives are added to the fuels in order to load combustion exhaust gases generated with resulting catalyst poisons.

7. Method according to claim 4, wherein ammonia is added to the combustion air in order to increase nitrogen oxide concentration in the combustion exhaust gases generated.

8. Method according to claim 4, wherein hydrocarbons are added to combustion exhaust gases in order to generate an exhaust gas with an increased hydrocarbon content.

9. Method according to claim 1 wherein the reversed stream flow is initiated within the combustion chamber of the burner apparatus, and the reversed stream flow includes a flow portion that extends, while within the combustion chamber, in a direction opposite to a flow direction of the first part-stream flow, which is a direct stream flow, and wherein said direct stream flow is confined within a concentrically arranged tube opening out in a section of said combustion chamber and said reversed stream flow travels within said concentrically arranged tube in a direction opposite to said direct stream flow.

10. Method according to claim 1, further comprising a heat exchanger concentrically arranged about the combustion chamber of the burner apparatus, and said second part-stream is placed in a cooling relationship with said heat exchanger and the first part-stream is arranged within said combustion chamber to avoid temperature reduction influence by said heat exchanger.

11. Method according to claim 1 further comprising using the hot combustion exhaust gases for the defined ageing of first and second automotive exhaust catalysts, wherein the first automobile exhaust catalyst is suited for operation under a first operating temperature range and the second automobile exhaust catalyst is suited for operation under a second operating temperature range different than the first, and said method comprises mounting the first automobile exhaust catalyst in a stream of the hot combustion exhaust gases and subjecting the first automobile exhaust catalyst to a first defined ageing process, removing the first automobile exhaust catalyst and mounting the second automobile exhaust catalyst, and subjecting the second automobile exhaust catalyst to a second defined ageing process following an adjusting of the desired temperature of the burner generated exhaust gases to conform to the different operating temperature of the second automobile exhaust catalyst.

12. Method according to claim 1 wherein the exhaust gases originating from the combustion process are divided into the first part-stream and the second part-stream while within a combustion chamber of the burner apparatus.

13. The method of claim 1 wherein the production of a stream of hot combustion gases derived from burner apparatus combustion comprises independently setting, in conjunction with burner apparatus operation, an air/fuel ratio and an exhaust-gas mass flow output, and further independently setting the temperature of the stream of hot combustion exhaust gases derived from the burner apparatus, and simulating an ageing of the exhaust catalyst by subjecting the exhaust catalyst to the combined stream of hot combustion gases in a predetermined manner.

14. Method according to claim 1 wherein the first part-stream and the second part-stream travel in independent conduits all the way from the combustion chamber until a point of being combined together whereat the first part-stream is cooled by contact with the second part-stream and wherein the combined first and second part-streams, upon contact with the exhaust catalyst, has a mass flow at or above that generated in the combustion chamber.

15. Method according to claim 1 wherein the first and second exhaust pipes are arranged such that the direct part-stream and the reversed stream travel independently of each other entirely between departing the combustion chamber until being combined such that the direct part-stream is cooled by contact with the reversed stream.

16. Method according to claim 1 wherein said burner is designed for an operation temperature that extends up to a temperature of 1000 to 1200 degrees Celsius.

17. A method for producing a stream of hot combustion exhaust gases at a settable temperature, power and air/fuel ratio comprising producing a stream of hot combustion gases at the settable temperature from an apparatus that includes a burner device having a fuel feed and a combustion-air feed, and a combustion chamber, characterized
  a) in that some of the exhaust gas generated by the burner device is discharged via a first exhaust pipe,
  b) in that a second exhaust pipe is provided as a bypass exhaust gas conduit which includes a heat exchanger, the heat exchanger configured to cool a flow of exhaust gases in the second exhaust pipe,
  c) in that the two exhaust pipes are combined again downstream as seen in the direction of flow of the exhaust gas, to form a common exhaust pipe,
  d) in that there exists throttle valving positioned to vary respective mass flow amounts in the first and second exhaust pipes to achieve a combined flow having the settable temperature and,
  wherein the burner device operates according to the principle of reversed firing, with a direct part-stream of the exhaust gas being discharged via the first exhaust pipe and the reversed stream being passed via the second exhaust pipe and wherein the burner device includes a burner, the power of which can be modulated and wherein said apparatus comprises a mounting device that is configured to mount an automotive exhaust catalyst for the purpose of defined simulated ageing of the automotive exhaust catalyst with hot combustion gases.

18. The method according to claim 17, wherein oil additives are added to the fuel via an injection location in order to subject the catalyst to be aged to the poisoning components which result therefrom and wherein ammonia or a compound which decomposes to form ammonia is added to the combustion air via the injection location, in order to subject the catalyst to be aged to an increased concentration of nitrogen oxides.

19. The method according to claim 17, wherein oil additives are added to the fuel via an injection location in order to subject the catalyst to be aged to the poisoning components which result therefrom and wherein hydrocarbons are added to the exhaust-gas stream via the injection location.

20. The method of claim 17, further comprising wherein the stream of hot combustion exhaust gases is used for the defined, thermal loading of a ceramic component wider an oxidizing or reducing atmosphere.

21. Method according to claim 17, wherein the heat exchanger forms a first section of the second exhaust pipe.

22. Method according to claim 17, wherein the burner flame is guided by a concentrically arranged tube which opens out into the first exhaust-gas path.

23. Method according to claim 22, wherein a radiation protection shield is arranged around the tube.

24. Method according to claim 23, wherein the combustion chamber is water-cooled and the heat exchanger is formed by the walls of the water-cooled combustion chamber.

25. Method according to claim 17, wherein the combustion chamber is water-cooled and the heat exchanger is constructed in accordance with the countercurrent principle by a tubular heat exchanger arranged above the combustion chamber.

26. Method according to claim 17, wherein the apparatus is configured for the defined ageing of the automotive exhaust catalyst and at least one of the combustion-air feed, fuel feed and an exhaust pipe containing at least one of the first part-stream and the second part-stream has an injection location for gaseous or liquid additives.

27. A method for producing a stream of hot combustion exhaust gas with a settable temperature using an apparatus, comprising:
  producing an exhaust gas that originates from a combustion process generated in the apparatus, and which apparatus includes a burner device having a fuel feed and a combustion-air feed, wherein
  a) some of the exhaust gas generated by the burner device is discharged via a first exhaust pipe having a throttle valve,
  b) the throttle valve is bypassed by a second exhaust pipe, which includes a heat exchanger and a further throttle valve, and
  c) the two exhaust pipes are combined again downstream of the throttle valves, as seen in the direction of flow of the exhaust gas, to form a common exhaust pipe; and
  wherein the method further comprises:
  dividing the exhaust gases originating from the combustion process into a first part-stream and a second part-stream, with different mass flows, and
  combining again the first part-stream and the second part-stream after cooling of the second part-stream, in order to produce the stream of hot combustion exhaust gases at a temperature between the temperature of the combustion process and the temperature of the cooled, second part-stream; and
  defined ageing of an exhaust catalyst by subjecting the exhaust catalyst to the combined first part-stream and the second part-stream, and
  wherein the exhaust gases generated by the combustion process are divided into a direct stream and a reversed stream, with the direct stream forming the first part-stream and the reversed stream forming the second part-stream; and wherein the burner device includes a burner, the power of which can be modulated, and wherein the production of the stream of the hot combustion gas comprises independently setting a power level and an air/fuel ratio in the burner device, and further independently setting the temperature of the stream of hot combustion exhaust gases derived from the burner device in order to simulate automobile engine exhaust catalyst ageing in the defined ageing of the exhaust catalyst.

\* \* \* \* \*